(12) United States Patent
Liu et al.

(10) Patent No.: US 9,122,294 B2
(45) Date of Patent: Sep. 1, 2015

(54) DIGITALLY CONTROLLED NON-INVERTING BUCK-BOOST DC-DC CONVERTER SYSTEM

(71) Applicant: NATIONAL CHENG KUNG UNIVERSITY, Tainan (TW)

(72) Inventors: Han-Chien Liu, Tainan (TW); Chien-Hung Tsai, Tainan (TW); Yu-Shin Tsai, Tainan (TW)

(73) Assignee: National Cheng Kung University, Tainan (TW)

( * ) Notice: Subject to any disclaimer, the term of this patent is extended or adjusted under 35 U.S.C. 154(b) by 365 days.

(21) Appl. No.: 13/737,111

(22) Filed: Jan. 9, 2013

(65) Prior Publication Data

US 2014/0077870 A1   Mar. 20, 2014

(30) Foreign Application Priority Data

Sep. 19, 2012   (TW) ............................. 101134332 A

(51) Int. Cl.
| | | |
|---|---|---|
| G05F 1/00 | (2006.01) | |
| G05F 1/62 | (2006.01) | |
| H02M 3/158 | (2006.01) | |
| H02M 3/157 | (2006.01) | |

(52) U.S. Cl.
CPC ............... *G05F 1/62* (2013.01); *H02M 3/1582* (2013.01); *H02M 3/157* (2013.01)

(58) Field of Classification Search
CPC ..................................................... H02M 3/157
USPC ......................................................... 323/283
See application file for complete search history.

(56) References Cited

U.S. PATENT DOCUMENTS

| | | | |
|---|---|---|---|
| 7,180,268 | B2 | 2/2007 | Denning et al. |
| 7,696,736 | B2 | 4/2010 | Latham et al. |
| 2006/0227861 | A1* | 10/2006 | Maksimovic et al. ........ 375/238 |
| 2009/0237064 | A1* | 9/2009 | Vigelius ....................... 323/350 |
| 2010/0134083 | A1* | 6/2010 | Trescases ..................... 323/283 |

FOREIGN PATENT DOCUMENTS

| | | |
|---|---|---|
| TW | 200536231 A | 11/2005 |
| TW | 200910744 A | 3/2009 |
| TW | 201025817 A | 7/2010 |
| WO | 2007/059450 A2 | 5/2007 |

\* cited by examiner

*Primary Examiner* — Jue Zhang
(74) *Attorney, Agent, or Firm* — Rosenberg, Klein & Lee

(57) ABSTRACT

A digitally controlled non-inverting buck-boost DC-DC converter system including a non-inverting buck-boost DC-to-DC converter control module and a negative feedback module and applicable for a radio frequency circuit module is revealed. By locking a duty cycle to two specific levels, the non-inverting buck-boost DC-to-DC converter control module only needs a single operation mode to achieve the required effects. Simultaneously, pulse-skipping phenomenon is also avoided. Furthermore, a reference voltage is modified through a reference voltage correction circuit of the negative feedback module to eliminate errors between previous DC output voltage and the reference voltage. Thereby the DC output voltage can remain in a stable state so as to reduce operational defects during the mode transition.

10 Claims, 7 Drawing Sheets

DIGITALLY CONTROLLED NON-INVERTING BUCK-BOOST DC-DC CONVERTER SYSTEM

BACKGROUND OF THE INVENTION

1. Field of the Invention

The present invention relates to a power supply system applied to a radio frequency circuit module, especially to a digitally controlled non-inverting buck-boost DC-DC converter system applied to a radio frequency circuit module. The pulse-skipping behavior is avoided by locking duty-cycle. Moreover, a reference voltage is modified through a reference voltage correction circuit. Thus a digital compensation circuit neglects errors of a DC output voltage and converges into a steady state. The output voltage oscillation behavior is further improved and a stable, wide range direct current is output to match requirements of adjustable voltage of a power amplifier in the RF circuit module.

2. Description of Related Art

Due to broader use of wireless electronics, more and more consumers concern that whether batteries inside the wireless electronic have a power saving setting. Generally, the power consumption of portable products including mobile phones, tablet computers, notebooks, etc. is related to the following three components: displays, antenna receivers and transmitters, and digital processors. In the antenna receivers and transmitters, the component that consumes most of the power is a power amplifier. The power amplifier available now can adjust the operating voltage. Thus a lot of energy is saved when a signal is not with the largest strength and the battery life is extended. For example, when the wireless electronic is closer to the base station, only a little bit increasing of the signal is required to solve the signal attenuation problem and transmit RF signals successfully. In power source selection, a buck-boost DC-DC converter that outputs higher/lower battery voltage is the best choice. In contrast, a conventional boost converter is unable to provide proper voltage when the power amplifier requires low power consumption and low voltage operation. This results in a great amount of power loss between the power converter and the power amplifier. Yet the buck-boost DC-DC converter can avoid such problem.

The buck-boost DC-DC converter includes four switches for the buck/boost operation by means of saving switching losses. Thus switching losses of the 4-switch converter may be double of those of a buck or boost converter and this is a significant shortcoming. The solution to overcome the shortcoming mentioned-above available now is buck/boost operation. The principle of the buck/boost operation is checking the values of output and input voltages so as to determine which mode the converter is operating in. Thus there are only two switches for control of the duty-cycle no matter which mode is used. The other two switches are kept on-state/off-state and there are no switching losses. Thus the number of switching times of the switches in each cycle is decreased, so as to decrease the switching losses. However, a problem of how to determine the timing of mode switching is derived from the buck/boost operation. When the mode switching is not working well, pulse-skipping occurs. Once the converter is operated within the range near the extreme values of the duty cycle, the duty cycle sent by the controller is quite unstable. A large jitter is generated randomly. Once the jitter occurs in the steady state, the voltage has changes and further large-scale pulse-skipping occurs. Unfortunately, the mode switching timing of the buck/boost operation may just fall on the position with the worst linearity of the duty cycle. When the pulse-skipping mentioned above occurs, unstable power output may lead to imprecise operating voltage of the power amplifier. The output voltage even falls to the voltage level being too low during the skipping process. This causes a partial distortion of the RF signals during the transmission process. This is also called duty-discontinuity.

When the reference voltage value the load end of the buck-boost converter falls within the mode switching range, the above duty-discontinuity occurs. That means the duty cycle is non-linear, discontinuous. The jitter duty cycle results in unstable output voltage so that the output voltage fails to converge to the reference value (voltage). The method for solving the unstable output voltage problem caused by duty-discontinuity during mode transition available now is duty-overlapping.

The method is to overlap the duty-cycle signals of the two modes (buck/boost) within a switching cycle to get an average result and create a voltage value that only a single duty cycle is unable to generate. However, the duty-overlapping method has following disadvantages: (a) In this method, buck/boost operation is run in turn within a switching cycle so that four switches of the converter all need to be switched. Thus the efficiency is reduced due to the switching losses. (b) The duty-overlapping must be run under a certain condition to ensure that the pulse skipping will not occur. In order to get an averaged and proper output voltage, there is a plurality of combinations. For example, when the condition of the output voltage required is M=0.98 ($M=V_o/V_{bat}$, wherein $V_o$ is an output voltage while $V_{bat}$ is an input voltage), the combination can be buck mode/92%+boost mode/4%, buck mode/90%+boost mode/6% or others so as to average out a precise output value. The same averaged output value is resulted from different duty cycle combinations of the two modes. Thus the duty cycle of the two modes may still have respective variations. The duty cycles must be locked in a fixed solution of a solution set so as to avoid the pulse slipping caused by different combinations of the duty cycles.

Thus there is room for improvement and a need to provide a novel buck-boost DC-DC converter system that improves the above shortcomings caused by duty-discontinuity.

SUMMARY OF THE INVENTION

Therefore it is a primary object of the present invention to provide a power supply system applied to a radio frequency (RF) circuit module that avoids pulse-skipping by locking a duty cycle. Moreover, a reference voltage is modified through a reference voltage correction circuit so as to make a digital compensation circuit neglect errors of DC output voltage and converge into a steady state. The output voltage oscillation behavior is further improved and a stable, wide range direct current is output to match requirements of adjustable voltage of a power amplifier in the RF circuit module.

In order to achieve the above object, a digitally controlled non-inverting buck-boost DC-DC converter system of the present invention is applied to a radio frequency (RF) circuit module. The RF circuit module consists of a power amplifier and an antenna connected to the power amplifier.

The digitally controlled non-inverting buck-boost DC-DC converter system includes a non-inverting buck-boost DC-DC converter control module and a negative feedback module connected to an output end of the non-inverting buck-boost DC-DC converter control module. In response to a DC input voltage, the non-inverting buck-boost DC-DC converter control module changes a time ratio of on/off state by duty cycle variations so as to output a DC output voltage in a buck mode or a boost mode. The RF circuit module is connected to an output end of the non-inverting buck-boost DC-DC converter control module. The negative feedback module includes a reference voltage correction circuit a digital compensation circuit, and a digital pulse width modulation module. The reference voltage correction circuit is used for input of the DC output voltage, the DC input voltage and a reference voltage. The reference voltage correction circuit generates and sends a discrete error signal to the digital compensation circuit. After processing, the digital compensation circuit outputs a discrete duty cycle signal to the digital pulse width modulation module. After comparing the discrete duty cycle signal with a digital signal whose wave shape is similar to triangular wave, the digital pulse width modulation module outputs a duty cycle c(t) so as to control on/off state of switches of the non-inverting buck-boost DC-DC converter control module. Thus the DC output voltage of the non-inverting buck-boost DC-DC converter control module follows the reference voltage and gets a steady state.

In the above digitally controlled non-inverting buck-boost DC-DC converter system, the reference voltage correction circuit includes a multiplexer, an encoder and an analog to digital conversion circuit. The multiplexer is used to receive a duty-cycle locking signal, and selectively output the DC input voltage or the reference voltage according to the duty-cycle locking signal. The analog to digital conversion circuit is for receiving the DC output voltage. In the encoder, a difference between the output voltage of the multiplexer and the output voltage of the analog to digital conversion circuit is sampled and quantified to generate a discrete error signal. When the reference voltage falls in a non-linear region of the duty cycle, the duty-cycle locking signal is initiated. Moreover, the non-linear region of the duty cycle includes a ratio of DC output voltage to DC input voltage ranging from 0.95 to 1 in the buck mode and a ratio of DC output voltage to DC input voltage ranging from 1 to 1.05 in the boost mode. Thereby the duty cycle is locked to two specific levels and the non-inverting buck-boost DC-DC converter control module only needs a single operation mode to reach effects required effect. Compared with conventional overlap method of the duty cycle, switching times of the switches in each cycle are decreased to reduce the switching losses. Furthermore, by pulse-skipping can be avoided by locking the duty cycle directly. Then the reference voltage is modified properly through the reference voltage correction circuit so as to eliminate errors between original DC output voltage and the reference voltage. Thus the DC output voltage is maintained at a stable level to improve the operational defects during the mode transition of the non-inverting buck-boost DC-DC converter control module.

In the above digitally controlled non-inverting buck-boost DC-DC converter system, the non-inverting buck-boost DC-DC converter control module consists of a first switch connected to a positive electrode of the DC input voltage, a second switch whose two ends are connected to the first switch and a negative electrode of the DC input voltage respectively, an inductor connected to the first switch and the second switch respectively, a third switch connected to the inductor and the negative electrode of the DC input voltage respectively, a fourth switch connected to the inductor and the third switch respectively, and a capacitor connected to the fourth switch and the negative electrode of the DC input voltage respectively.

In the digitally controlled non-inverting buck-boost DC-DC converter system, mentioned above, the digital compensation circuit includes a compensation voltage lookup table (LUT) conversion circuit. During switching of the buck mode or the boost mode, the compensation voltage lookup table conversion circuit 1221 is reset to make the discrete error signal return to zero. Furthermore, the output end of the reference voltage correction circuit is connected to a transient time estimation module. During switching of the buck mode or the boost mode, the compensation voltage lookup table conversion circuit is controlled by the transient time estimation module to be reset after a specific period of time. Thus the DC output voltage will not change greatly. By the estimation of the specific period of time of the transient time estimation module and reset of the compensation voltage lookup table conversion circuit, the process of the non-inverting buck-boost DC-DC converter control module to reach a steady state after the mode switching is accelerated and there is no output error or larger transient oscillation occurred. The unstable output voltage problem of conventional digital compensation circuit caused by back delay, poor transient speed or the like during mode transition can be solved. At the same time, the possibility of both brief inductor current surge and component burn out can be reduced. The specific period of time is obtained by calculation, i.e. a difference between the DC input voltage and the DC output voltage is divided by a maximum change of discrete duty-cycle signal within a switching cycle and then times the switching cycle.

In the digitally controlled non-inverting buck-boost DC-DC converter system, mentioned above, the output end of the digital pulse width modulation module is connected to a dead time control circuit 13 for control of dead time to minimize energy loss of switches of the non-inverting buck-boost DC-DC converter control module during switching.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
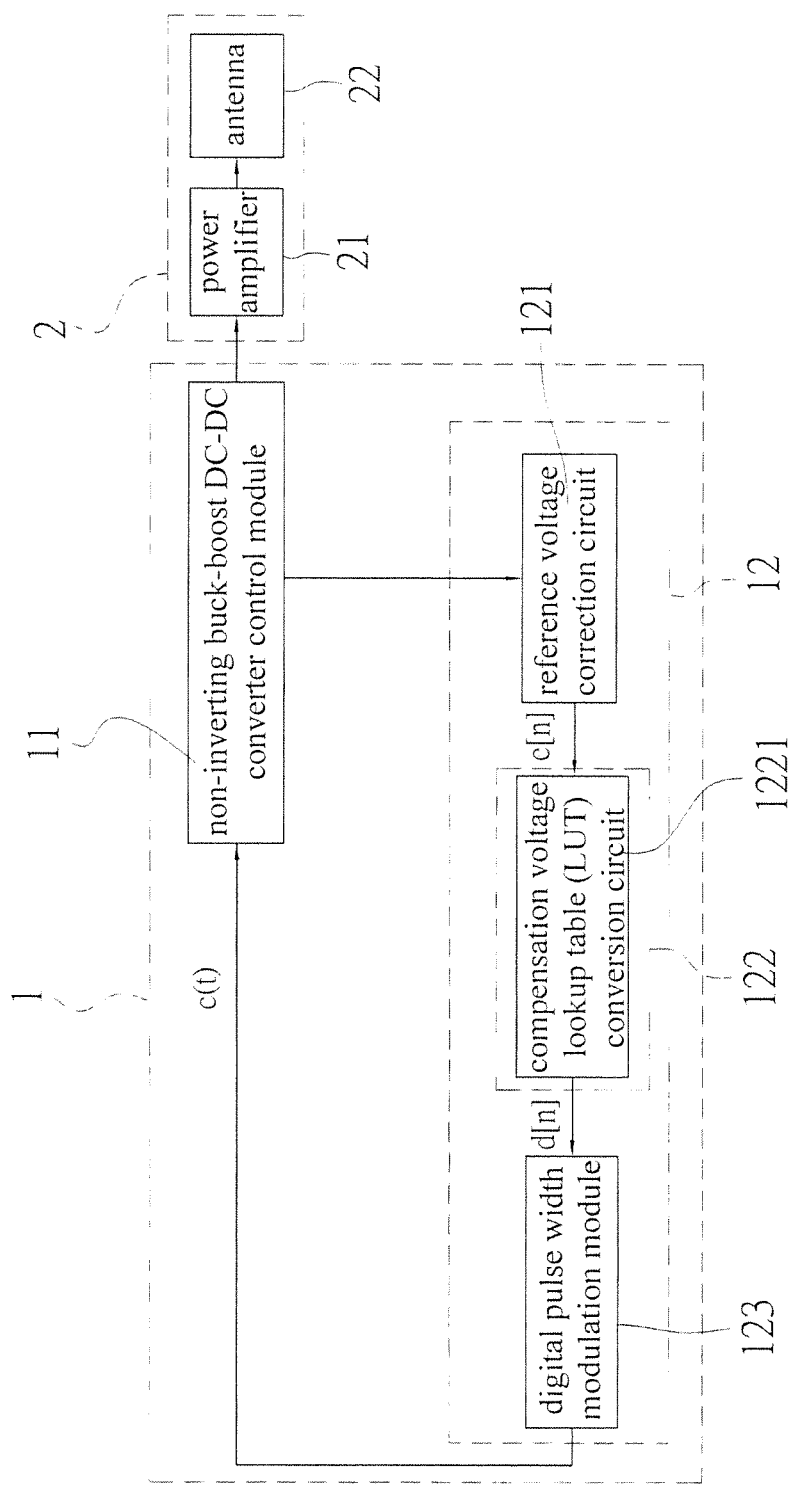
FIG. 1 is a block diagram showing circuit configuration of an embodiment of a digitally controlled non-inverting buck-boost DC-DC converter system applied to a radio frequency (RF) circuit module according to the present invention.

Refer to FIG. 1, a block diagram showing circuit configuration of an embodiment of a digitally controlled non-inverting buck-boost DC-DC converter system applied to a radio frequency circuit module is revealed. A digitally controlled non-inverting buck-boost DC-DC converter system 1 of the present invention is applied to a radio frequency (RF) circuit module 2. The RF circuit module 2 consists of a power amplifier 21 and an antenna 22 connected to the power amplifier 21.

The digitally controlled non-inverting buck-boost DC-DC converter system 1 includes a non-inverting buck-boost DC-DC converter control module 11 and a negative feedback module 12 connected to an output end of the non-inverting buck-boost DC-DC converter control module 11. The non-inverting buck-boost DC-DC converter control module 11 changes a time radio of on/off state by a duty cycle c(t) so as to output a DC output voltage $V_o$ in a buck mode or a boost mode in response to a DC input voltage $V_{bat}$. The RF circuit module 2 is connected to an output end of the non-inverting buck-boost DC-DC converter control module 11.

Figure 2:
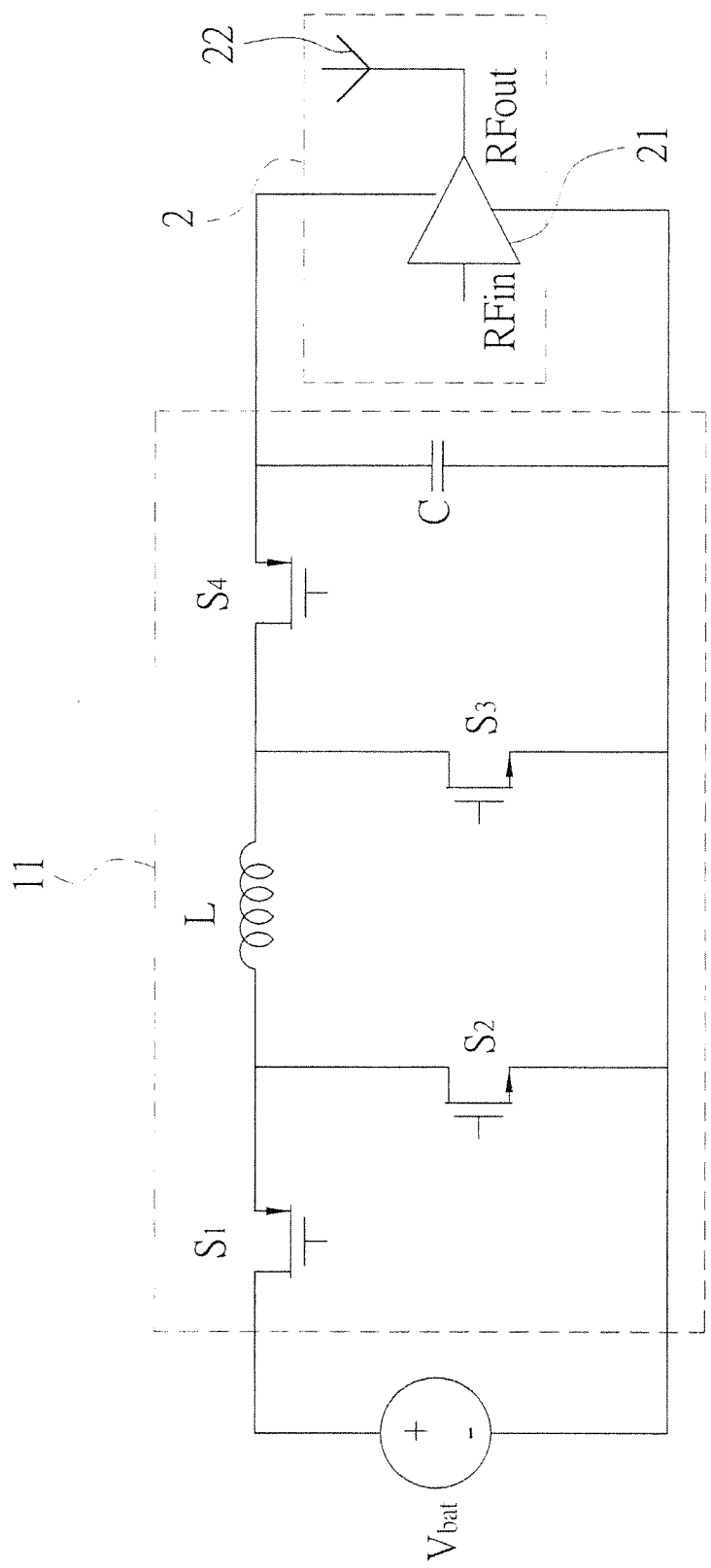
FIG. 2 is a circuit diagram of a non-inverting buck-boost DC-DC converter control module and a RF circuit module of an embodiment according to the present invention.

Refer to FIG. 2, an internal circuit diagram of the non-inverting buck-boost DC-DC converter control module 11 and the RF circuit module 2 is disclosed. The non-inverting buck-boost DC-DC converter control module 11 is composed of a first switch $S_1$ connected to a positive electrode of the DC input voltage $V_{bat}$, a second switch $S_2$ whose two ends are connected to the first switch $S_1$ and a negative electrode of the DC input voltage $V_{bat}$ respectively, an inductor L connected to the first switch $S_1$ and the second switch $S_2$ respectively, a third switch $S_3$ connected to the inductor L and the negative electrode of the DC input voltage $V_{bat}$ respectively, a fourth switch $S_4$ connected to the inductor L and the third switch $S_3$ respectively, and a capacitor C connected to the fourth switch $S_4$ and the negative electrode of the DC input voltage $V_{bat}$ respectively. The RF circuit module 2 is connected to the capacitor C in parallel. The first switch $S_1$, the second switch $S_2$, the third switch $S_3$, and the fourth switch $S_4$ can be a metal-oxide-semiconductor field effect transistor (MOSFET) or an insulated gate bipolar transistor (IGBT). In this embodiment, they are all MOSFET.

Figure 3:
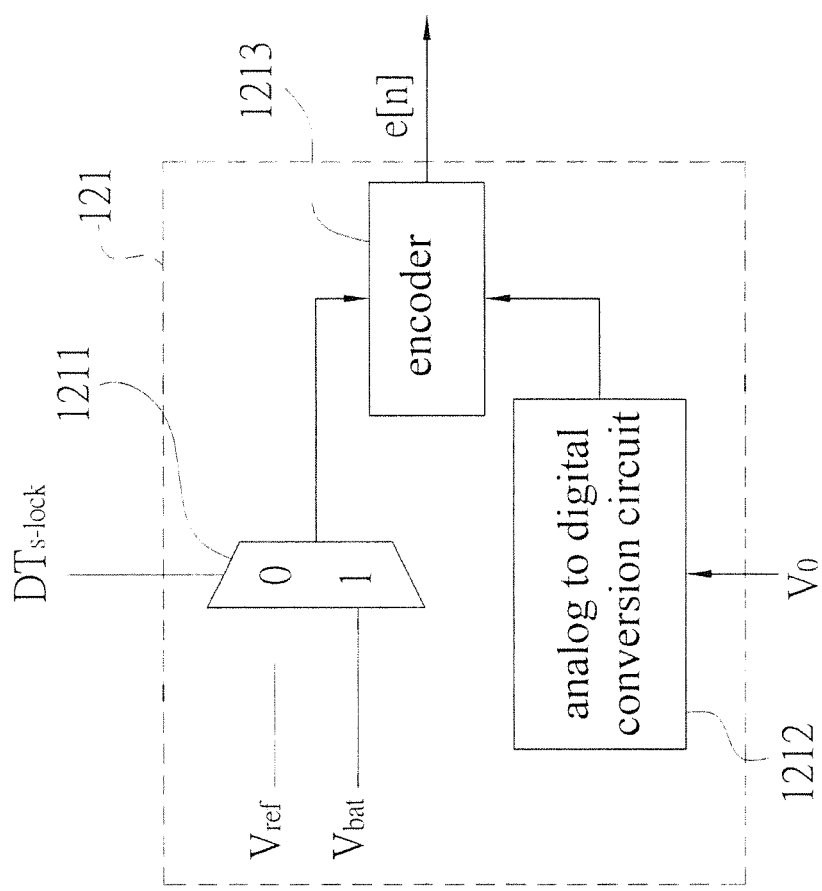
FIG. 3 is a block diagram showing circuit configuration of a reference voltage correction circuit according to the present invention.

The negative feedback module 12 is connected to an output end of the non-inverting buck-boost DC-DC converter control module 11 and is having a reference voltage correction circuit 121, a digital compensation circuit 122, and a digital pulse width modulation module 123. The reference voltage correction circuit 121 is used for input of DC output voltage $V_o$, DC input voltage $V_{bat}$ and a reference voltage $V_{ref}$. Refer to FIG. 3, the reference voltage correction circuit 121 includes a multiplexer 1211, an encoder 1213 and an analog to digital conversion circuit 1212. The multiplexer 1211 is used to receive a duty-cycle locking signal $DT_{s-lock}$, and control the output of the DC input voltage $V_{bat}$ or the reference voltage $V_{ref}$ according to the duty-cycle locking signal. The analog to digital conversion circuit 1212 is used for receiving the DC output voltage $V_o$. In the encoder 1213, a difference between the output voltage of the multiplexer 1211 and the output voltage of the analog to digital conversion circuit 1212 is sampled and quantified to generate a discrete error signal e[n]. The duty-cycle locking signal $DT_{s-lock}$ is generated when the reference voltage $V_{ref}$ falls in a non-linear region of the duty cycle c(t). The non-linear region of the duty cycle c(t) includes a ratio of DC output voltage $V_o$ to DC input voltage $V_{bat}$ ranging from 0.95 to 1 in the buck mode and a ratio of DC output voltage $V_o$ to DC input voltage $V_{bat}$ ranging from 1 to 1.05 in the boost mode. The above reference voltage correction circuit 121 generates a discrete error signal e[n] to the digital compensation circuit 122. After processing of the digital compensation circuit 122, a discrete duty cycle signal d[n] is output to the digital pulse width modulation module 123. The digital pulse width modulation module 123 outputs a duty cycle c(t) by comparing the discrete duty cycle signal d[n] with a digital signal whose wave shape is similar to triangular waves, so as to control on/off state of switches of the non-inverting buck-boost DC-DC converter control module 11. Thus the DC output voltage $V_o$ of the non-inverting buck-boost DC-DC converter control module 11 can follow the reference voltage $V_{ref}$ and become stable.

Moreover, the digital compensation circuit 122 includes a compensation voltage lookup table (LUT) conversion circuit 1221. The dynamic range of the discrete error signal e[n] into the digital compensation circuit 122 is not large, only 3~4 bits. Thus the lookup table is used to replace a multiplier so as to implement a digital compensator. Then, while the discrete error signal e[n] entering the digital compensation circuit 122, a corresponding memory address is selected according to the value of the discrete error signal e[n] and next get its content to be processed by adders, so as further to obtain the discrete duty cycle signal d[n] at the moment. In this embodiment, the digital compensation circuit 122 is a digital PID (proportional integral derivative) compensator.

While the digitally controlled non-inverting buck-boost DC-DC converter system 1 is in use, its mode operation is to set the duty ratio of the buck mode and the duty ratio of the boost mode at 100% and 5% respectively, so as to maintain the duty cycle c(t) at a constant value. 100% duty ratio means that the duty-cycle c(t) is on-state, so that the DC output voltage $V_o$ is equal to the DC input voltage $V_{bat}$(M=1) when the non-inverting buck-boost DC-DC converter control module 11 is in discontinuous operation area of the buck mode (i.e. the reference voltage $V_{ref}$ falls within a range of 0.95<M<1). This is an only stable state within the mode-transition. At the same time, it is ensured that the DC output voltage $V_o$ is higher than the reference voltage $V_{ref}$ so that the power amplifier 21 will not malfunction. When the non-inverting buck-boost DC-DC converter control module 11 is entering discontinuous operation area of the boost mode (i.e. reference voltage $V_{ref}$ falls within a range of 1<M<1.05), 5% duty ratio means that the duty cycle c(t) is quite low but already falling in a normal continuous area. Thus there is no jitter in the steady state. Furthermore, the DC output voltage $V_o$ is about 1.05 times of the DC input voltage $V_{bat}$(M=1.05) when the duty ratio is 5%. The DC output voltage $V_o$ is also higher than the reference voltage $V_{ref}$ and this satisfies the premise of correct operation of the power amplifier. Thereby, once the negative feedback module 12 detects that the reference voltage enters the mode transition area, it locks the output duty-cycle c(t) at the constant value mentioned above so as to stabilize the DC output voltage $V_o$. Compared with conventional technique that pursues "continuity of the output voltage", the present invention compulsorily locks the duty cycle c(t) so as to achieve stabilization of the DC output voltage $V_o$ during the mode-transition.

Refer to FIG. 3, when the non-inverting buck-boost DC-DC converter control module 11 works well, the multiplexer 1211 delivers the reference voltage $V_{ref}$ directly to the output voltage of the analog to digital conversion circuit 1212 for calculating the discrete error signal e[n]. If the duty-cycle locking signal $DT_{s-lock}$ is generated, the multiplexer 1211 changes to send out the DC input voltage $V_{bat}$. For example, when the DC input voltage $V_{bat}$ is 3.0 Volt and the non-inverting buck-boost DC-DC converter control module 11 operates in a specific condition of "buck mode/100% duty ratio", discrete components on a current path will have a bit voltage drop due to parasitic resistance. Thus the DC output voltage $V_o$ becomes 2.95 Volt. Once a piece of information the multiplexer 1211 sends to the encoder 1213 modifies the original reference voltage $V_{ref}$ into 2.95 Volt, the negative feedback module 12 falsely assumes that the output target is 2.95 Volt and automatically converges the duty cycle c(t) to 100%. The digital compensation circuit 122 finally stabilizes the DC output voltage $V_o$ at 2.95 Volt. Moreover, the value of the DC output voltage $V_o$ and the value of the modified reference voltage are both 2.95 Volt. This leads to a result that the discrete error signal e[n] must be zero. Thus the digital compensation circuit 122 learns that the system is stable and it will not modify the discrete duty cycle signal d[n]. Therefore the duty cycle c(t) is locked in a specific condition of "buck mode/100% duty ratio" for a long term. The system has stable specifications after close loop compensation and there is no output error or larger transient oscillation during the transient convergence process.

Furthermore, the above mode operation will cause the discrete duty cycle signal d[n] being amplified seriously. For example, when the reference voltage $V_{ref}$ suddenly increases to a quite high value, the requirement of the DC output voltage $V_o$ is unable to be satisfied even the discrete duty cycle signal d[n] in the buck mode increases to the maximum value. Thus the non-inverting buck-boost DC-DC converter control module 11 is switched to the boost mode so as to increase the DC output voltage $V_o$ continuously. Due to the mode change, the discrete duty cycle signal d[n] may need to change from a larger value before the mode transition to a smaller one immediately after the mode transition. However, there is a limit on the digital compensation circuit 122 to modify the discrete duty cycle signal d[n]. It may take several to hundreds of switching cycles for revising down the discrete duty cycle signal d[n]. During the period of revising down, the non-inverting buck-boost DC-DC converter control module 11 is switched to the boost mode so that the duty cycle becomes abnormally high and the DC output voltage $V_o$ is suddenly pulled up at the moment of mode transition. Thus the present invention resets the compensation voltage lookup table (LUT) conversion circuit 1221 to make the discrete error signal e[n] return to zero during switching of the buck mode or the boost mode. Thereby the non-inverting buck-boost DC-DC converter control module 11 can switch the modes smoothly, without any problem of rapidly-increasing of the voltage.

Figure 4:
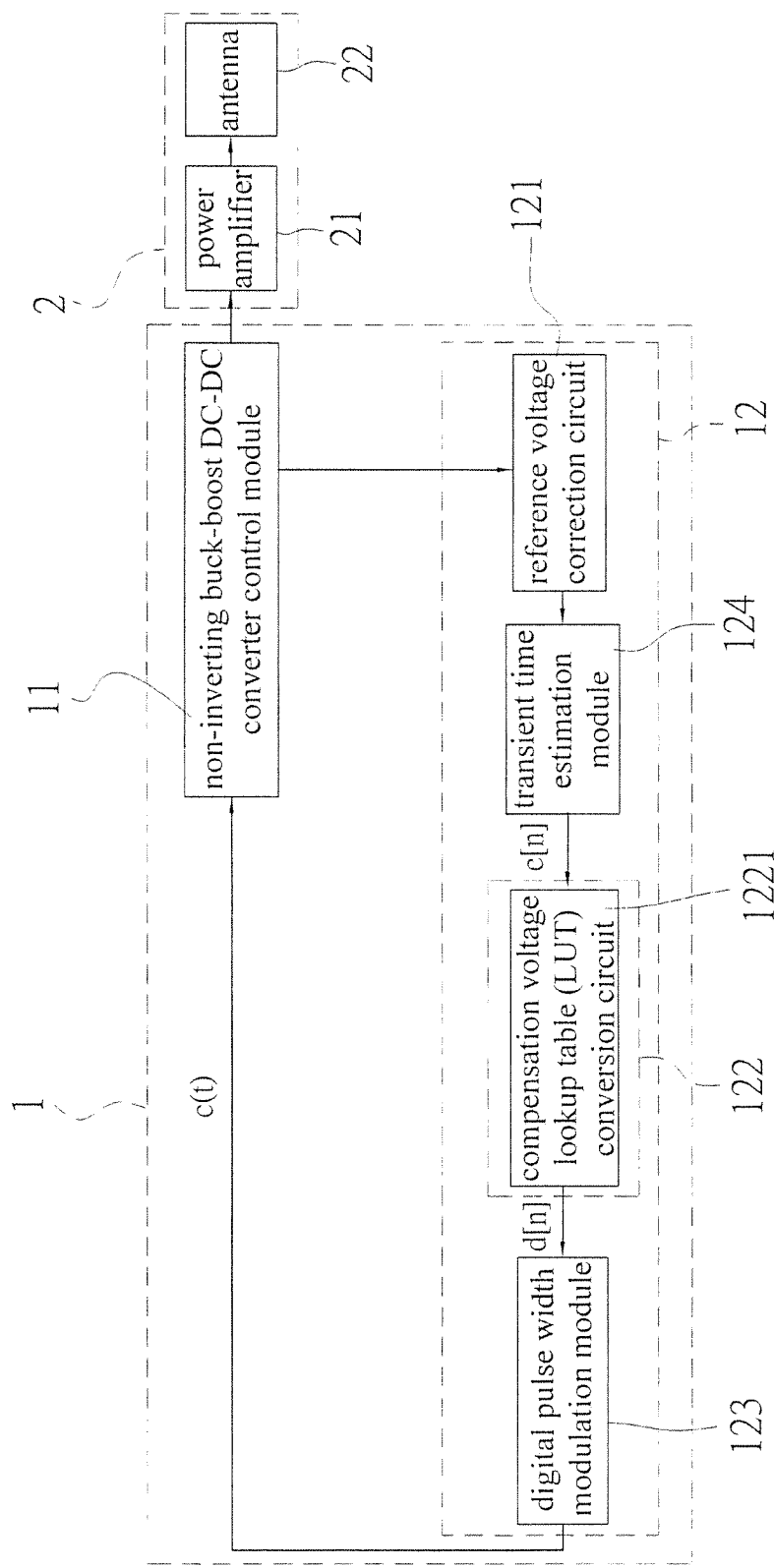
FIG. 4 is a block diagram showing circuit configuration of another embodiment of a digitally controlled non-inverting buck-boost DC-DC converter system applied to a radio frequency circuit module according to the present invention.
Figure 5:
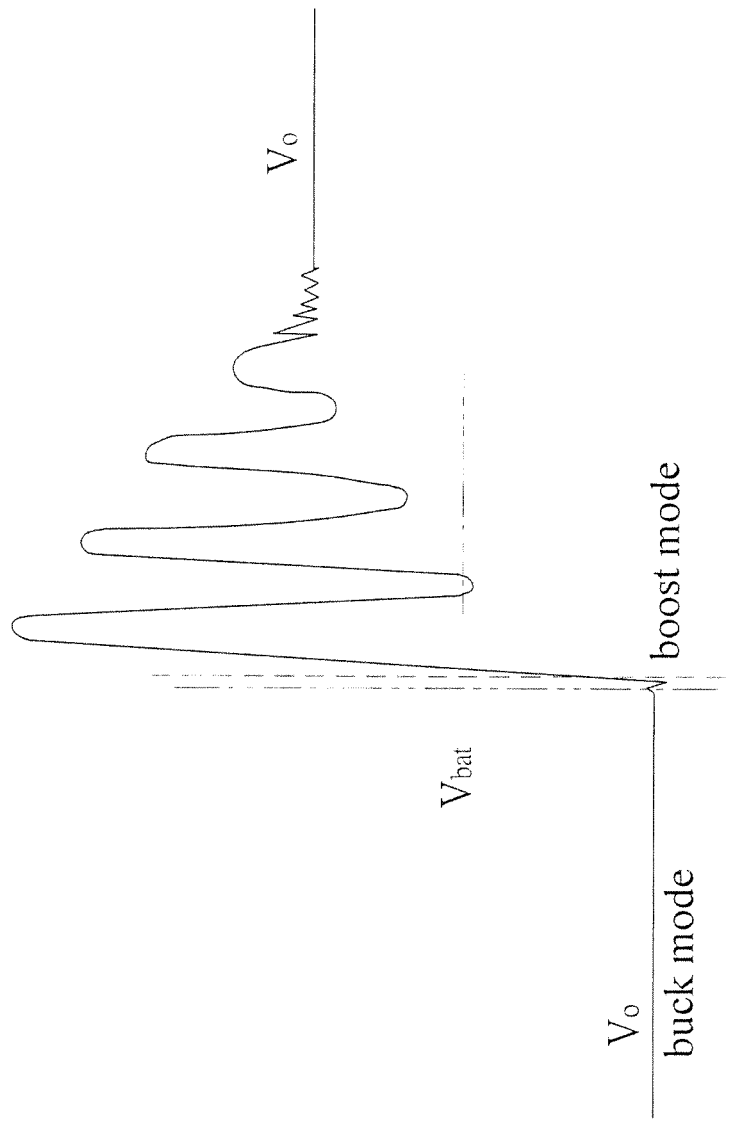
FIG. 5 is schematic drawing showing transient response of a compensation voltage lookup table conversion circuit without being reset by a transient time estimation module after a specific period of time according to the present invention.
Figure 6:
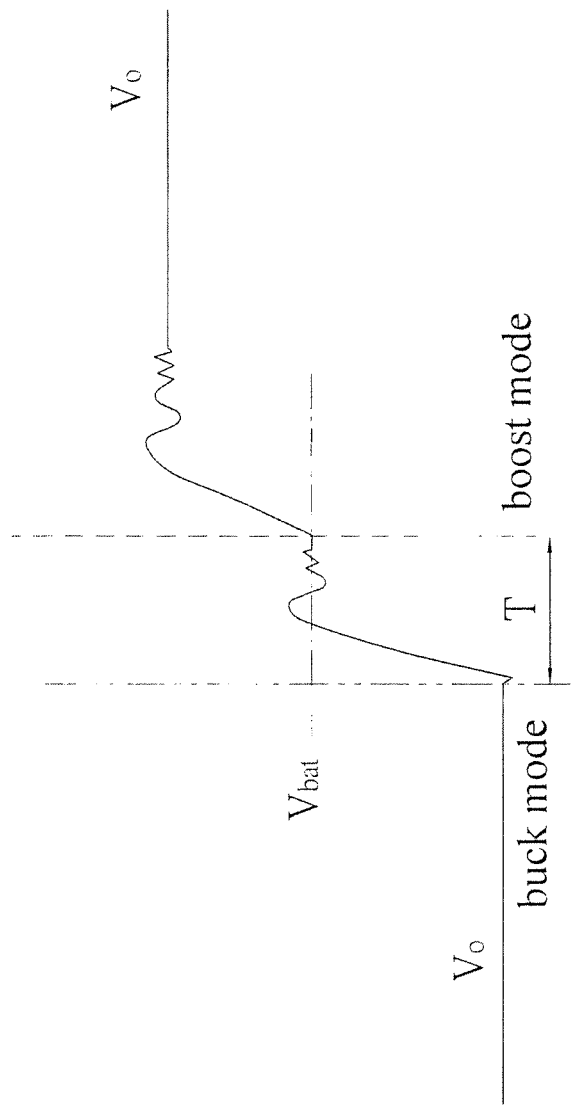
FIG. 6 is schematic drawing showing transient response of a compensation voltage lookup table conversion circuit being reset by a transient time estimation module after a specific period of time according to the present invention.

Refer to FIG. 4, another embodiment of the present invention is revealed. The difference between this embodiment and the above one is in that the output end of the reference voltage correction circuit 121 is connected to a transient time estimation module 124. During switching of the buck mode or the boost mode, the transient time estimation module 124 controls the compensation voltage lookup table conversion circuit 1221 to be reset after a specific period of time T. Thus the DC output voltage $V_o$ will not change a great deal. The specific period of time T is obtained by calculation, i.e. the difference between the DC input voltage $V_{bat}$ and the DC output voltage $V_o$ is divided by the maximum variation of the discrete duty cycle signal d[n] within a switching cycle and then times the switching cycle. In use, when the reference voltage $V_{ref}$ suddenly changes and the operation of the non-inverting buck-boost DC-DC converter control module 11 needs to be switched, a duty-cycle locking signal $DT_{s-lock}$ is generated and the reference voltage $V_{ref}$ is corrected to the DC input voltage $V_{bat}$ by the reference voltage correction circuit 121. Now the non-inverting buck-boost DC-DC converter control module 11 uses the DC input voltage $V_{bat}$ as a target and converges the DC output voltage $V_o$ to the DC input voltage $V_{bat}$. When the DC output voltage $V_o$ is getting closer to the DC input voltage $V_{bat}$, the discrete error signal e[n] entering the digital compensation circuit 122 is reduced and the error between the DC input voltage $V_{bat}$ and the DC output voltage $V_o$ falls into a correction range of the discrete duty cycle signal d[n]. Within such condition, the compensation voltage lookup table conversion circuit 1221 is reset so that an instant change of the duty-cycle c(t) will not cause the DC output voltage $V_o$ to have a great change. Thus an equivalent open loop of the digital compensation circuit 122 can be avoided. Refer to FIG. 5 and FIG. 6, schematic drawings showing transient response of the compensation voltage lookup table conversion circuit 1221 without being reset by the transient time estimation module 124 after a specific period of time T and being reset by the transient time estimation module 124 after a specific period of time T respectively are revealed. From the figures, t is obvious that the specific period of time T is the time needed for converging the DC output voltage $V_o$ to the DC input voltage $V_{bat}$ before reset of the compensation voltage lookup table conversion circuit 1221. Thus during the step of mode transition, there is a short process for reducing output gap. The specific time period T is estimated by the transient time estimation module 124 and then the compensation voltage lookup table conversion circuit 1221 is reset after the specific time period T so as to accelerate the process that the non-inverting buck-boost DC-DC converter control module 11 reaches a steady state after mode transition for preventing output errors and avoiding larger transient oscillation.

Figure 7:
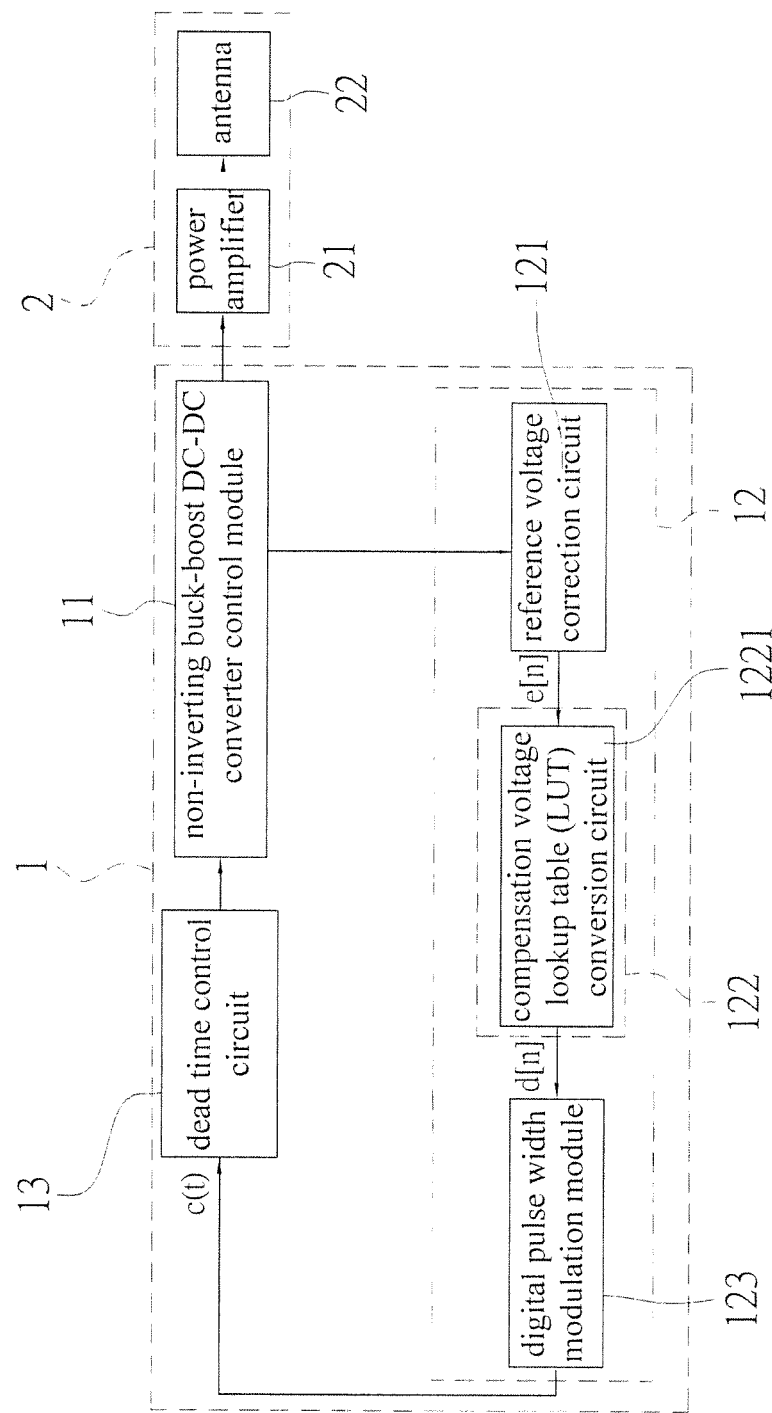
FIG. 7 is a block diagram showing circuit configuration of a further embodiment of a digitally controlled non-inverting buck-boost DC-DC converter system applied to a radio frequency circuit module according to the present invention.

Refer to FIG. 7, a further embodiment is revealed. The difference between this embodiment and the above one is in that an output end of the digital pulse width modulation module 123 of this embodiment is further connected to a dead time control circuit 13 for control of dead time to minimize energy loss of the non-inverting buck-boost DC-DC converter control module 11 during switching of switches. The dead time occurs because that electric energy stored in the parasitic capacitance C will increase the time that switches turn on and off in the non-inverting buck-boost DC-DC converter control module 11 to cause the phenomenon that all the switches are on-state at the same time. For example, refer to FIG. 2, once a switching interval of the first switch $S_1$ and the second switch $S_2$ is too short (the dead time is too short), the first switch and the second switch may be conducting at the same time because one of them is not turned off completely. Thus the DC input voltage $V_{bat}$ is connected directly to have short circuit and a shoot-through current occurs. This is not only wasting energy but components in the non-inverting buck-boost DC-DC converter control module 11 are also easy to get damaged. On the other hand, once the dead time is designed too long, the time for turning off the two switches at the same time will get too long. In practice, the dead time is fixed according to the time that the switches need to be switched so as to prevent waste of energy during switching of respective switch.

In summary, a digitally controlled non-inverting buck-boost DC-DC converter system of the present invention has following advantages:

1. The present invention avoids pulse-skipping phenomenon by direct locking of duty cycle. The requirement for keeping the duty-cycle in a constant value is satisfied. Then the reference voltage is corrected properly by the reference voltage correction circuit to eliminate the errors between original DC output voltage and the reference voltage. This is another condition that avoids duty-cycle oscillation. Thus the DC output voltage can be maintained at a stable level so as to reduce operational defects of the non-inverting buck-boost DC-DC converter control module during the mode transition.
2. The digitally controlled non-inverting buck-boost DC-DC converter system of the present invention locks the duty cycle to two specific levels, without being affected by variations of the reference voltage. Thus the non-inverting buck-boost DC-to-DC converter control module only needs a single operation mode to achieve the required effects. Compared with the conventional duty overlapping, the switching times of the switches in each cycle can be reduced so as to minimize the switching losses.

3. The present invention resets the compensation voltage lookup table (LUT) conversion circuit after a specific period of time estimated by the transient time estimation module. Thus the non-inverting buck-boost DC-DC converter control module reaches a steady state more rapidly after the mode transition. Therefore the output errors and larger transient oscillation are further avoided and the problem of unstable output voltage of conventional digital compensation circuit caused by various factors such as back delay, poor transient speed or the like during mode transition is solved. At the same time, the possibility of both brief inductor current surge and component burn out is reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A digitally controlled non-inverting buck-boost DC-DC converter system applied to a radio frequency (RF) circuit module, the system comprising:

a non-inverting buck-boost DC-DC converter control module that changes a time ratio of on/off state of switches by a duty cycle to output a DC output voltage in a buck mode or a boost mode in response to a DC input voltage and the RF circuit module is connected to an output end of the non-inverting buck-boost DC-DC converter control module; and a negative feedback module that is connected to an output end of the non-inverting buck-boost DC-DC converter control module and is having a reference voltage correction circuit, a digital compensation circuit, and a digital pulse width modulation module; the reference voltage correction circuit is used for input of the DC output voltage, the DC input voltage and a reference voltage; the reference voltage correction circuit generates and sends a discrete error signal to the digital compensation circuit; then the digital compensation circuit outputs a discrete duty cycle signal to the digital pulse width modulation module after processing; the digital pulse width modulation module outputs the duty cycle after comparing the discrete duty cycle signal with a digital signal whose wave shape is similar to triangular wave so as to control on/off state of switches of the non-inverting buck-boost DC-DC converter control module; thus the DC output voltage of the non-inverting buck-boost DC-DC converter control module follows the reference voltage and reaches a steady state;

wherein the reference voltage correction circuit includes a multiplexer, an encoder and an analog to digital conversion circuit;

the multiplexer is used to receive a duty-cycle locking signal, and control the output of the DC input voltage or the reference voltage according to the duty-cycle locking signal;

the analog to digital conversion circuit is for receiving the DC output voltage;

in the encoder, a difference between the output voltage of the multiplexer and the output voltage of the analog to digital conversion circuit is sampled and quantified to generate a discrete error signal; and the duty-cycle locking signal is generated when the reference voltage falls in a non-linear region of the duty cycle.

2. The system as claimed in claim 1, wherein the non-linear region of the duty cycle includes a ratio of DC output voltage to DC input voltage ranging from 0.95 to 1 in the buck mode and a ratio of DC output voltage to DC input voltage ranging from 1 to 1.05 in the boost mode.

3. The system as claimed in claim 1, wherein the non-inverting buck-boost DC-DC converter control module includes a first switch connected to a positive electrode of the DC input voltage, a second switch connected to the first switch and a negative electrode of the DC input voltage respectively, an inductor connected to the first switch and the second switch respectively, a third switch connected to the inductor and the negative electrode of the DC input voltage respectively, a fourth switch connected to the inductor and the third switch respectively, and a capacitor connected to the fourth switch and the negative electrode of the DC input voltage respectively.

4. The system as claimed in claim 3, wherein each of the first switch, the second switch, the third switch, and the fourth switch is able to be either a metal-oxide-semiconductor field effect transistor (MOSFET) or an insulated gate bipolar transistor (IGBT).

5. The system as claimed in claim 1, wherein the digital compensation circuit includes a compensation voltage lookup table (LUT) conversion circuit.

6. The system as claimed in claim 5, wherein during switching of the buck mode or the boost mode, the compensation voltage look up table conversion circuit is reset to make the discrete error signal return to zero.

7. The system as claimed in claim 6, wherein an output end of the reference voltage correction circuit is connected to a transient time estimation module; during switching of the buck mode or the boost mode, the compensation voltage lookup table conversion circuit is controlled by the transient time estimation module to be reset after a specific period of time so that the DC output voltage will not have a great variation.

8. The system as claimed in claim 7, wherein a difference between the DC input voltage and the DC output voltage is divided by the maximum variation of the discrete duty cycle signal within a switching cycle and then times the switching cycle so as to get the specific period of time.

9. The system as claimed in claim 1, wherein an output end of the digital pulse width modulation module is connected to a dead time control circuit for control of dead time to minimize energy loss of the switches of the non-inverting buck-boost DC-DC converter control module during switching.

10. The system as claimed in claim 1, wherein the RF circuit module includes a power amplifier and an antenna connected to the power amplifier.

* * * * *